United States Patent
Tsai et al.

(10) Patent No.: US 11,115,165 B2
(45) Date of Patent: Sep. 7, 2021

(54) METHOD AND APPARATUS FOR MULTIPLE TRANSMIT/RECEIVE POINT (TRP) OPERATIONS

(71) Applicant: FG Innovation Company Limited, Tuen Mun (HK)

(72) Inventors: Tsung-Hua Tsai, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 88 days.

(21) Appl. No.: 16/673,151

(22) Filed: Nov. 4, 2019

(65) Prior Publication Data
US 2020/0145159 A1    May 7, 2020

Related U.S. Application Data

(60) Provisional application No. 62/754,706, filed on Nov. 2, 2018.

(51) Int. Cl.
*H04L 1/00*   (2006.01)
*H04W 72/04*  (2009.01)
*H04L 5/00*   (2006.01)

(52) U.S. Cl.
CPC .......... *H04L 5/0048* (2013.01); *H04L 5/0023* (2013.01); *H04L 5/0035* (2013.01); *H04L 5/0053* (2013.01); *H04W 72/042* (2013.01)

(58) Field of Classification Search
CPC ... H04L 5/0048; H04L 5/0023; H04L 5/0035; H04L 5/0053; H04W 72/042
See application file for complete search history.

(56) References Cited

U.S. PATENT DOCUMENTS

| | | | |
|---|---|---|---|
| 2017/0288743 A1* | 10/2017 | Nam | H04B 7/024 |
| 2018/0302889 A1 | 10/2018 | Guo et al. | |
| 2019/0230545 A1* | 7/2019 | Liou | H04W 24/10 |
| 2020/0015200 A1* | 1/2020 | Vilaipornsawai | H04W 72/042 |
| 2020/0045700 A1* | 2/2020 | Sun | H04W 72/04 |
| 2020/0178280 A1* | 6/2020 | Guan | H04B 7/0626 |
| 2020/0221487 A1* | 9/2020 | Lee | H04W 72/12 |

FOREIGN PATENT DOCUMENTS

| | | |
|---|---|---|
| CN | 108092754 A | 5/2018 |
| CN | 108199819 A | 6/2018 |
| WO | 2018128376 A1 | 7/2018 |

* cited by examiner

*Primary Examiner* — Ronald B Abelson
(74) *Attorney, Agent, or Firm* — ScienBiziP, P.C.

(57) ABSTRACT

A method includes receiving, by a User Equipment (UE), Transmission Configuration Indicator (TCI) state data in a Physical Download Control Channel (PDCCH) determining multiple Physical Downlink Shared Channels (PDSCHs), where the TCI state data is associated with multiple Demodulation Reference Signal (DMRS) port groups, and obtaining, by the UE, multiple Quasi Co-Location (QCL) assumptions for receiving the PDSCHs based on the DMRS port groups associated with the TCI state data.

12 Claims, 6 Drawing Sheets

METHOD AND APPARATUS FOR MULTIPLE TRANSMIT/RECEIVE POINT (TRP) OPERATIONS

CROSS-REFERENCE TO RELATED APPLICATION(S)

The present application claims the benefit of and priority to a provisional U.S. Patent Application Ser. No. 62/754,706 filed on Nov. 2, 2018, entitled "Procedure for Multiple Transmit/Receive Point," (hereinafter referred to as "US75391 application"). The disclosure of the US75391 application is hereby incorporated fully by reference into the present application.

FIELD

The present disclosure generally relates to wireless communications, and more particularly, to methods and apparatuses for multiple Transmit/Receive Point (TRP) operations.

BACKGROUND

Various efforts have been made to improve different aspects of wireless communications (e.g., data rate, latency, reliability, mobility, etc.) for the next generation (e.g., Fifth Generation (5G) New Radio (NR)) wireless communication systems. Among the new concepts in the next generation wireless communication systems, leveraging multiple TRPs may be vital to improve coverage, reliability, and capacity performance of the system. For example, in order to support the growth in data traffic in 5G and to enhance the coverage, the wireless devices may be expected to access networks composed of multiple TRPs.

However, in the current multi-TRP environment, all TRPs in a cell may have the same cell Identity (ID), which means a User Equipment (UE) may not be able to distinguish these TRPs from each other if there is no further identification or information for each TRP.

Therefore, there is a need in the art for an improved communication mechanism for multiple TRP operations.

SUMMARY

The present disclosure is directed to methods and apparatuses for multi-TRP operations.

According to an aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to receive Transmission Configuration Indicator (TCI) state data in a Physical Download Control Channel (PDCCH) determining multiple Physical Downlink Shared Channels (PDSCHs), where the TCI state data is associated with multiple Demodulation Reference Signal (DMRS) port groups. The processor is further configured to obtain multiple Quasi Co-Location (QCL) assumptions for receiving the PDSCHs based on the DMRS port groups associated with the TCI state data.

According to another aspect of the present disclosure, a method of wireless communications is provided. The method includes receiving, by a UE, TCI state data in a PDCCH determining multiple PDSCHs, where the TCI state data is associated with a multiple DMRS port groups. The method further includes obtaining, by the UE, multiple QCL assumptions for receiving the PDSCHs based on the DMRS port groups associated with the TCI state data.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
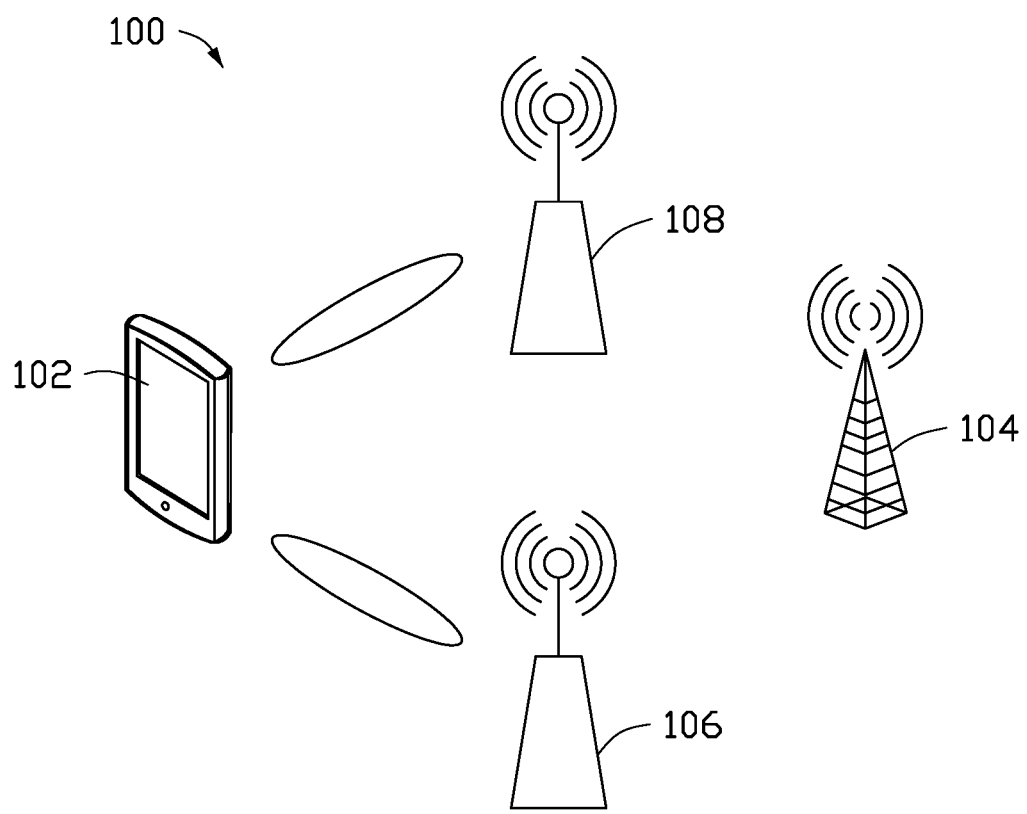
FIG. 1 is a schematic diagram illustrating a multi-TRP system, in accordance with example implementations of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G New Radio (NR) Radio Access Network (RAN)) typically includes at least one Base Station (BS), at least one User Equipment (UE), and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more BSs.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A BS may include, but is not limited to, a node B (NB) as in the UMTS, an evolved Node B (eNB) as in the LTE or LTE-A, a Radio Network Controller (RNC) as in the UMTS, a Base Station Controller (BSC) as in the GSM/GERAN, a ng-eNB as in an Evolved Universal Terrestrial Radio Access (E-UTRA) BS in connection with the 5GC, a next generation Node B (gNB) as in the 5G-RAN, and any other apparatus capable of controlling radio communication and managing radio resources within a cell. The BS may serve one or more UEs through a radio interface.

The BS is operable to provide radio coverage to a specific geographical area using a plurality of cells forming the radio access network. The BS supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The BS can communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the $3^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaptation may be configured based on the channel conditions and/or the service applications.

Moreover, it is also considered that in a transmission time interval TX of a single NR frame, a Downlink (DL) transmission data, a guard period, and an Uplink (UL) transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

FIG. 1 is a schematic diagram illustrating a multi-TRP system 100, in accordance with example implementations of the present application. As shown in FIG. 1, the multi-TRP system 100 includes a UE 102, a BS 104, and TRPs 106 and 108. It should be noted that even though two TRPs are included in the example implementation illustrated in FIG. 1, any number of TRPs may communicate with the UE in some other implementations. In addition, each TRP may communicate with the BS 104 through a wired or wireless connection.

The TRPs 106 and 108 may be macro-cells, small-cells, pico-cells, femto-cells, Remote Radio Heads (RRHs), relay nodes or antenna panels, which may be deployed anywhere such as in the interior of a room, in/on a building, on top of a house or streetlamps. The UE 102 may connect to the BS 104 through the TRPs 106 and 108.

Each of the TRPs 106 and 108 may have one or more antenna panels to provide directional beams towards the UE 102. The antenna panels distributed on the TRPs may be jointly used in the data transmissions to the UE, thereby forming a Multi-Input Multi-Output (MIMO) system.

Figure 2:
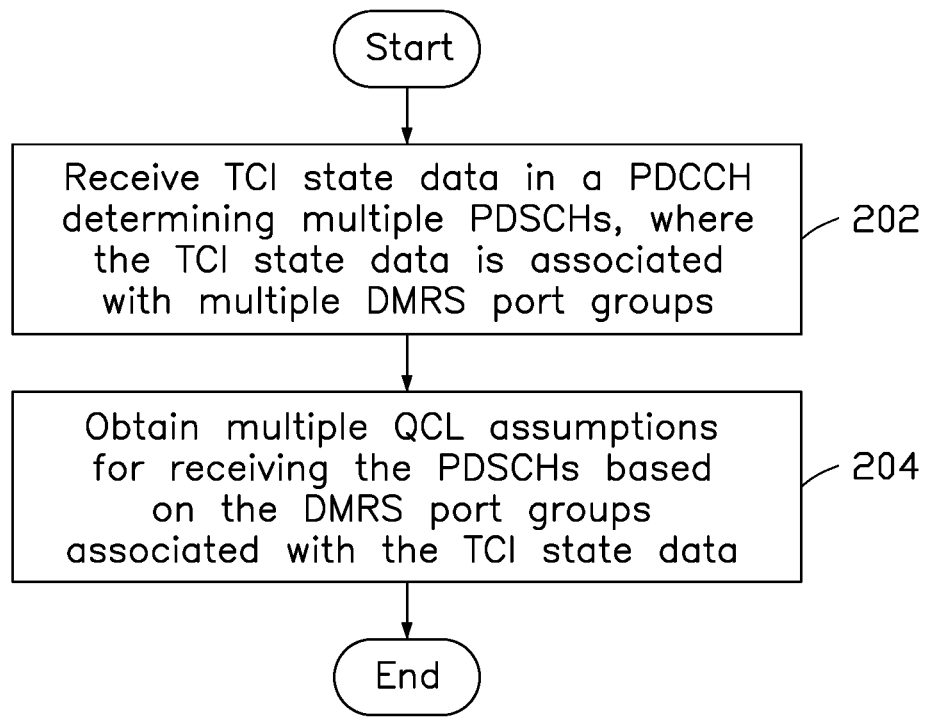
FIG. 2 is a flowchart for a process of multi-TRP operations, in accordance with example implementations of the present application.

FIG. 2 is a flowchart for a process of multi-TRP operations, in accordance with example implementations of the present application.

In action 202, the UE may receive TCI state data in a PDCCH determining multiple PDSCHs. The TCI state data may be associated with multiple DMRS port groups. In action 204, the UE may obtain multiple QCL assumptions for receiving the PDSCHs based on the DMRS port groups associated with the TCI state data.

The QCL assumptions may include different parameters, such as the spatial-domain QCL parameters (e.g., QCL TypeD parameter), or other QCL parameters such as, at least one of the average delay, the delay spread, the Doppler shift, and the Doppler spread. For example, each QCL assumption may include at least one of a time-domain QCL parameter, a frequency-domain QCL parameter, and a spatial-domain QCL parameter.

In some of the present implementations, the UE may identify different TRPs (e.g., the TRPs 106 and 108 in FIG. 1) based on the QCL assumptions.

In some of the present implementations, each QCL assumption may correspond to one of the DMRS port groups associated with the TCI state data. For example, the QCL assumptions and the DMRS port groups may have a one-to-one mapping relationship. In some of the present implementations, the UE may receive the DMRS port groups corresponding to the PDSCHs via a Radio Resource Control (RRC) signaling.

In some of the present implementations, the mapping relationship between the QCL assumptions and the DMRS port groups may be modified. For example, the UE may receive an instruction for indicating a relationship (e.g., a mapping relationship) between the QCL assumptions and the DMRS port groups via a Medium Access Control (MAC) Control Element (CE), Downlink Control Information (DCI), or an RRC signaling. In some of the present implementations, indicating the relationship between the QCL assumptions and the DMRS port groups may include at least one of modifying, adding, deleting, and selecting the relationship between the QCL assumptions and the DMRS port groups. In some other implementations, the UE may be configured with a timer, and the mapping relationship between the QCL assumptions and the DMRS port groups may be modified when the timer expires.

In some of the present implementations, the TCI state of a DL channel (e.g., a PDCCH or a PDSCH) may include multiple QCL Reference Signal (RS) sets, and each QCL RS set may correspond to one DMRS port group. For example, the TCI state data may correspond to a TCI state configuration that includes multiple QCL RS sets, and each of the QCL RS sets may correspond to one of the DMRS port groups associated with the TCI state data.

Figure 3:
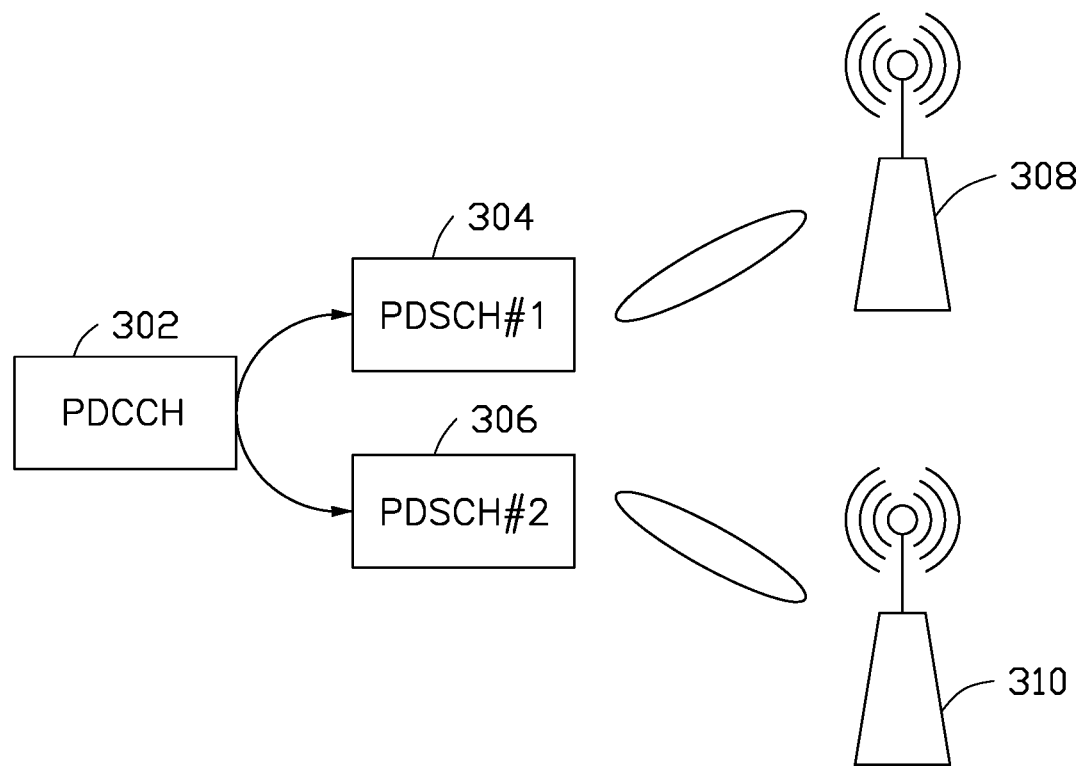
FIG. 3 is a schematic diagram illustrating multiple PDSCHs determined from a single PDCCH, in accordance with example implementations of the present application.

FIG. 3 is a schematic diagram illustrating multiple PDSCHs determined from a single PDCCH, in accordance with example implementations of the present application. As shown in FIG. 3, the UE may receive DCI that contains a TCI state data (e.g., a TCI code point) from the PDCCH 302. After successfully decoding the TCI code point, the UE may obtain multiple TCI states each being associated with one DMRS port group. For example, each TCI state may contain parameters for configuring the QCL relationship between the DL/UL RS(s) and the DM-RS port(s) of a corresponding PDSCH. The QCL relationship may be configured by higher layer parameters, such as qcl-Type1 and qcl-Type2. In addition, the QCL type (e.g., QCL-TypeA, QCL-TypeB, QCL-TypeC and QCL-TypeD) corresponding to each DL RS may be given by a higher layer parameter (e.g., qcl-Type) in the QCL assumption/information. In some other implementations, the TCI state data may be a TRP index that is configured per a cell/Component Carrier (CC), or Bandwidth Part (BWP) basis.

In the example implementation, the UE may derive multiple PDSCHs based on the DMRS port groups associated with the TCI state data in the DCI, because each DMRS port group may correspond to one PDSCH. As shown in FIG. 3, if the TCI state data is associated with DMRS port group #1 and DMRS port group #2, which are configured by the BS via an RRC signaling, the UE may then determine the QCL assumptions for PDSCH #1 304 and PDSCH #2 306 based on the DMRS port group #1 and DMRS port group #2, respectively. Each of the PDSCHs (e.g., PDSCH #1 304 and PDSCH #2 306) derived from the PDCCH 302 may correspond to a TRP. As shown in FIG. 3, the PDSCH #1 304 and PDSCH #2 306 may be associated with TRPs 308 and 310, respectively. In some of the present implementations, after determining the QCL assumptions for the PDSCH #1 304 and the PDSCH #2 306, the UE may use them to identify the TRPs 308 and 310.

In some other implementations, the DCI in the PDCCH 302 may schedule a single PDSCH (not illustrated in FIG. 3), and the TRPs 308 and 310 may correspond to different transmission layers of this PDSCH. Each transmission layer may correspond to a data stream from a TRP.

In some of the present implementations, when a UE performs an initial access procedure successfully, the UE may obtain the resource(s) of a Downlink (DL)/Uplink (UL) channel/beam for communicating with the BS through a certain TRP. This TRP may be referred to as an initial access TRP. In some of the present implementations, the resource of a DL channel/beam may be a Synchronization Signal (SS)/Physical Broadcast Channel (PBCH) Block (SSB), and the UL channel/beam may be a Physical Random Access Channel (PRACH). The UE may select the SSB through a random access procedure, and use the corresponding resources (e.g., which are configured with the same spatial QCL (sQCL) assumption as the selected SSB) to perform channel/beam measurements.

In some of the present implementations, the UE may be configured with resources that are orthonormal to the SSB to perform the channel/beam measurements.

In some of the present implementations, a TRP may be classified as a primary TRP (pTRP) or a secondary TRP (sTRP) for further operations. For example, the UE may adopt different time-domain behaviors (e.g., the aperiodic/semi-persistent/periodic reporting behavior) to report Channel State Information (CSI)/beam measurement results to the pTRP(s) and sTRP(s). For example, the UE may adopt a periodic or semi-persistent reporting process with respect to the RS resource(s) coming from the pTRP, and apply an aperiodic reporting process with respect to the RS resource(s) coming from the sTRP.

In some of the present implementations, the UE may perform Beam Management (BM) procedures based on the network-configured resources. The UE may report the measurement results to the BS to help the BS to determine the primary communication link (e.g., including the pTRP) to the UE. For example, the BS may schedule a qualified resource (e.g., a beam/channel with a quality value exceeding a predetermined threshold) as the primary communication link to the UE. In this case, the TRP transmitting the qualified resource may be deemed as the pTRP.

In some of the present implementations, the UE may be notified to change its pTRP if the quality of the resource from the original pTRP changes. It should be noted that the number of the qualified resources and the pTRPs may be arbitrary.

In some of the present implementations, one or more antenna panels may be embedded in a single TRP. Each antenna panel may transmit at least one resource (beam/channel) in a time unit.

In some of the present implementations, the pTRP may be determined in an implicit way. For example, a TRP at which a specific resource is transmitted may be determined as a pTRP. The specific resource may include at least one of an SSB, a Channel State Information Reference Signal (CSI-RS), a Sounding Reference Signal (SRS), a PDCCH, a PDCCH that Control Resource Set (CORESET) #0 or search space #0 is located, a broadcast signal (e.g., a PBCH), a PDSCH of Remaining Minimum System Information (RMSI), and a beam/channel having a quality that exceeds a predetermined threshold. In some other implementations, the pTRP for the UE may be determined in an explicit way. For example, the BS may indicate one or more pTRPs to the UE via an RRC signaling, a MAC-CE or DCI.

Figure 4:
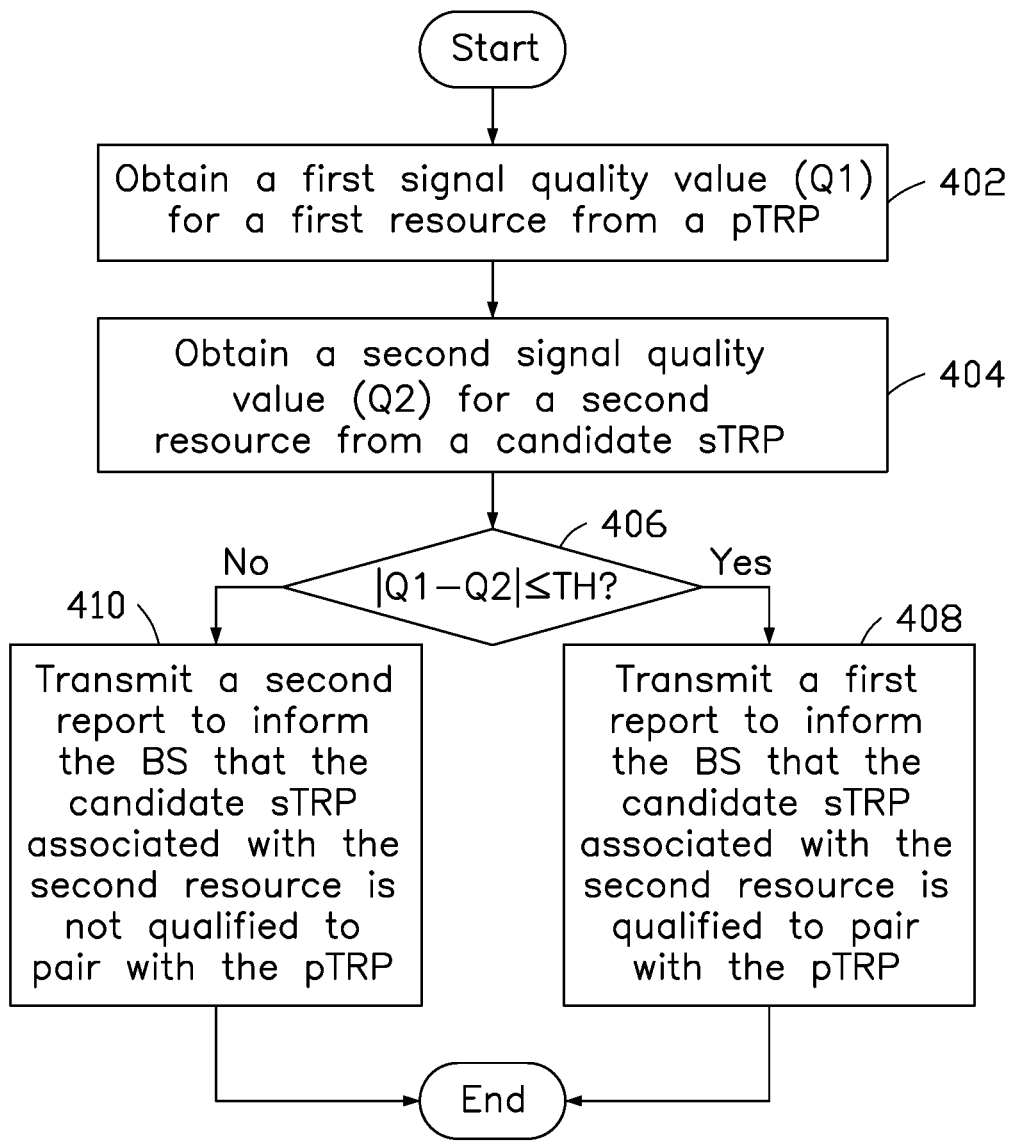
FIG. 4 is a flowchart for a process of identifying a secondary TRP (sTRP), in accordance with example implementations of the present application.

In some of the present implementations, for those TRPs that are not selected as the pTRP(s), they may be determined as sTRPs for the UE if these TRPs satisfy certain condition(s), as shown in FIG. 4.

FIG. 4 is a flowchart for a process of identifying an sTRP, in accordance with example implementations of the present application. In action 402, the UE may obtain a first signal quality value (Q1) for a first resource from a pTRP. In action 404, the UE may obtain a second signal quality value (Q2) for a second resource from a candidate sTRP. The values, Q1 and Q2, may be (but not limited to) Layer 1 (L1)-Reference Signals Received Power (RSRP) values, L1-Reference Signals Received Quality (RSRQ) values, L1-Signal to Interference plus Noise Ratio (SINR) values, RSRP values, RSRQ values, SINR values, or any combination thereof.

In action 406, the UE may determine whether the difference between Q1 and Q2 is less than, or equal to, a predetermined threshold (TH). In some of the present implementations, the predetermined threshold TH may be configured by the BS.

If the outcome of action 406 is "yes", the UE, in action 408, may transmit a first report to inform the BS that the candidate sTRP associated with the second resource is qualified to pair with the pTRP. In response to the first report, the BS may add this candidate sTRP as an sTRP for the UE, and inform the UE of the information of the pTRP(s) and/or sTRP(s). Conversely, if the outcome of action 406 is "no", the UE, in action 410, may transmit a second report to inform the BS that the candidate sTRP associated with the second resource is not qualified to pair with the pTRP. In this case, the BS may decide not to add this candidate sTRP as an sTRP for the UE.

In some of the present implementations, the first and second resources described in actions 402 and 404 may be composite resources. A composite resource may be the first one (or a predetermined one) of the resources in a resource set that is configured for the TRP, or a union resource among all the resource(s) in the resource set, or a resource corresponding to a statistical average beam direction of the TRP. The UE may receive the composite resource of a composite beam/channel from each TRP based on a corresponding QCL assumption. In some of the present implementations, the composite resource may be a TRP-specific resource or a cell-specific resource if the composite resource is composited by at least one SSB resource. Conversely, if the composite resource is not composited by any SSB resource, the composite resource may be a UE-specific resource. In some of the present implementations, the composite resource may be transmitted in a broadcast manner, and compared to a resource that is used in a single-TRP BM procedure, the composite resource may correspond to a wider beam.

Using the composite resources may help the UE perform multi-TRP measurements more efficiently, because the UE may only need to measure one resource (composite resource) for each TRP at the beginning of the measurement.

In some of the present implementations, when several TRPs are distributed around the UE, the UE may be configured with a composite resource set. Each composite resource in the composite resource set may represent an average beam direction of an individual TRP. In this manner, the UE may report suitable TRP pairs to the BS quickly.

In some of the present implementations, once the pTRP(s) and sTRP(s) are determined, the BS may collect these pTRP(s) and sTRP(s) in a serving TRP set, and inform the UE of this serving TRP set via RRC signaling, a MAC CE, DCI, or any combination thereof.

In some of the present implementations, a variation in beam/channel quality may lead to a change in the configuration of the pTRP(s) and/or sTRP(s). For example, when the BS detects that the TRP with the best/qualified beam quality has changed, the BS may instruct the UE to modify/select the related configurations of the pTRP(s) and/or sTRP(s) to change the pTRP(s) and/or sTRP(s).

In some of the present implementations, the UE may receive a trigger event with a predetermined offset from the BS. The UE may determine whether the difference between the beam/channel quality of the pTRP and that of the sTRP exceeds this predetermined offset. If the determination's result is positive, the UE may transmit a report to request the BS to modify/select the related configurations of the pTRP(s) and/or sTRP(s).

In some of the present implementations, the UE may monitor the CORESET of a TRP based on a QCL assumption that is made for monitoring a PDCCH that schedules multiple PDSCHs. In this case, each PDSCH may be transmitted from a separate TRP. In some other implementations, the UE may monitor the CORESET of a TRP based on a QCL assumption that is made for monitoring a PDCCH that schedules a single PDSCH. In this case, different transmission layers of this PDSCH may be transmitted by the respective TRPs. In some other implementations, the UE may monitor the CORESET of a TRP based on multiple QCL assumptions that are made for monitoring multiple PDCCHs, each scheduling a PDSCH, and each NR-PDSCH may be transmitted from a separate TRP. In some other implementations, the UE may monitor the CORESET of a TRP based on multiple QCL assumptions that are made for monitoring multiple PDCCHs, each scheduling a PDSCH, and each NR-PDSCH may be transmitted from a separate TRP.

Figure 5:
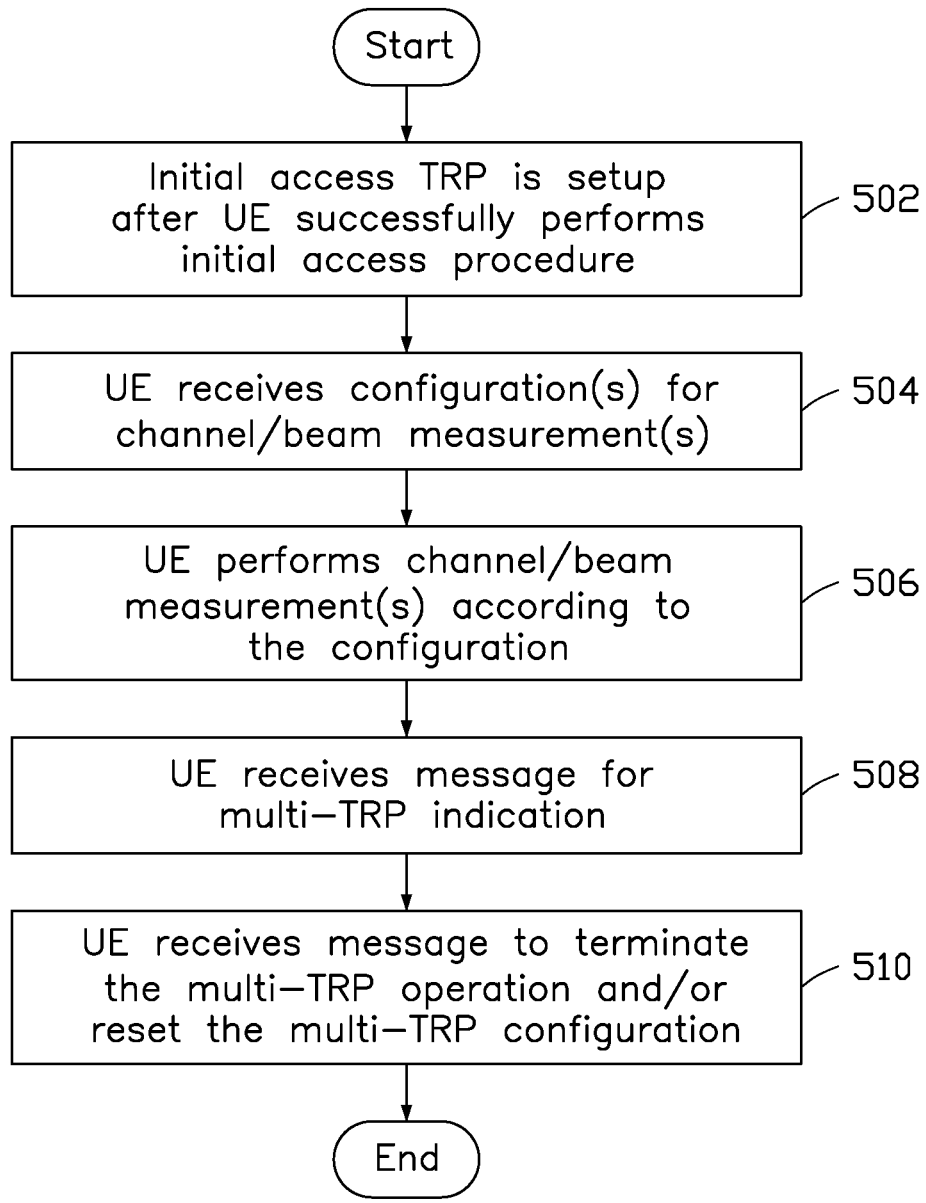
FIG. 5 is a flowchart for a process of multi-TRP operations, in accordance with example implementations of the present application.

FIG. 5 is a flowchart for a process of multi-TRP operations, in accordance with example implementations of the present disclosure.

In action 502, an initial access TRP is setup after the UE successfully performs an initial access procedure. For example, after successfully performing the initial access procedure, the UE may get a DL/UL resource (e.g., channel/beam) to communicate with the BS through a TRP. This TRP may be set as the initial access TRP for the UE. The initial access TRP may be used as a pTRP from the UE's perspective.

In action 504, the UE may receive configuration(s) for channel/beam measurement(s). For example, the UE may receive the configurations of K (e.g., K=0, 1, 2, . . . ) resource(s) and/or L (e.g., L=0, 1, 2, . . . ) resource for channel/beam measurements. The UE may apply the same QCL assumption as the SSB on which the UE camps during the random access procedure to receive the K resource(s). In addition, the L resource(s) may be orthonormal to the SSB on which the UE camps during the random access procedure. In some of the present implementations, the resources in the same resource set may have the same time-domain behavior, and each RS may correspond to a channel/beam of a TRP.

In action 506, the UE may perform channel/beam measurement(s) according to the configuration. For example, the UE may perform the channel/beam measurement(s) according to the configuration(s) of the K and/or L resource(s). The UE may obtain the channel/beam statues/quality information (e.g. L1-RSRP, L1-RSRQ, L1-SINR, RSRP, RSRQ, SINR, or any combination thereof) from the channel/beam measurement. In some of the present implementations, the spatial domain filter information for receiving each DL resource may be obtained from the measurement. The spatial domain information may include at least one Receive (RX) radiation pattern and/or RX panel.

In some of the present implementations, the UE may report at least one of the resource indicator (or beam index), the measurement metric information, and the correlation information according to the configuration(s) obtained in action 504. The resource indicator may be, but not limited to, an SSB resource indicator (if the resource is an SSB), a CSI-RS resource indicator (if the resource is a CSI-RS), a DMRS resource indicator (if the resource is a DMRS), or an SRS resource indicator. The measurement metric information may be, but not limited to, an L1-RSRP, an L1-RSRQ, an L1-SINR, a RSRP, a RSRQ, an SINR, or any combination thereof. In some of the present implementations, the measurement metric information that is related to a resource may be differentially encoded with respective to another resource. For example, a differential L1-RSRP offset level for the $2^{nd}$ measured resource may be obtained by subtracting L1-RSRP #1 from L1-RSRP #2, where L1-RSRP #1 is an L1-RSRP obtained from the $1^{st}$ resource measurement, and L1-RSRP #2 is an L1-RSRP obtained from the $2^{nd}$ resource measurement. The correlation information may include a correlation factor/indicator that indicates the spatial correlation between two or more observed resources. In some of the present implementations, the UE may compare the spatial correlation factor/indicator with a correlation threshold to determine whether the spatial correlation between the observed resources is high or not. The correlation threshold may be configured by the BS or determined based on the UE's implementations. The UE may be instructed to report the highest and/or lowest spatial correlation factor/indicator. In some of the present implementations, the correlation information may include at least one of a high/low correlation indicator and the indicators of the observed resources. The high/low correlation indicator may be used for indicating that the spatial correlation between the observed resources is high/low.

In some of the present implementations, the BS may determine compatible resources for serving the TRPs, based on the correlation information received from the UE, to improve the spatial diversity/multiplexing performance. In some of the present implementations, the correlation factor/indicator may be obtained by calculating the Angle-of-Arrival (AoA) related parameters for the channel/beams of the RS resources from the TRPs.

In action 508, the UE may receive a message of a multi-TRP indication (e.g., indicating the information of pTRP(s) and/or sTRP(s)). For example, the message for indicating the information of pTRP(s) may contain at least one TCI-state indication that indicates a reference RS resource for a DL control channel and/or an SSB selected through the random access procedure. In this case, CORESET #0 or search space #0 may be located in the reference RS resource. In addition, the message for indicating the information of sTRP(s) may include at least one TCI-state indication that indicates at least one reference resource(s) for the DL shared channel(s). In this case, the UE may know that the TRP transmitting the indicated reference resource is an sTRP. In some of the present implementations, the TCI-state indication may correspond to one or more DMRS port groups, and each DMRS port group ID may correspond to a TRP ID.

In some of the present implementations, the target RS port/resource group (e.g., the DMRS port group of a PDSCH/PDCCH) may have the same QCL assumption as that of the source TRP-RS resource, which means the UE may assume that all ports/resources in the same target RS port/resource group may be from the same TRP, while the ports/resources in different target RS port/resource groups may be from different TRPs.

In action 510, the UE may receive a message to terminate the multi-TRP operation and/or reset the multi-TRP configuration. For example, after receiving the message, the UE may terminate, cancel, or reset at least one of the correlation information of the reference RS resources among the TRPs, the TRP setting (e.g., including the resource setting and/or reporting setting), and the correspondence among the DMRS ports, DMRS port groups, TCI states, and QCL assumptions. In some of the present implementations, if there is no UE-specific scheduling for a while (e.g., before a timer expires), or a BWP switching happens, the UE may release the previous setting/configuration.

In some of the present implementations, the configuration that the UE receives in action 504 may be the composite resource configuration for the composite beam/channel from each TRP. The UE may perform channel/beam measurements on the composite resources of the respective TRPs. In this manner, the channel/beam measurements may be performed more efficiently, because the UE may only need to measure one resource (composite resource) for each TRP.

In some of the present implementations, the BS may indicate at least one pTRP resource set to the UE through at least one of the configuration of the pTRP, the predetermined resource(s) associated with the pTRP ID, and the best channel quality determined by the BS or UE.

In some of the present implementations, the BS may indicate at least one sTRP resource set to the UE through at least one of the configuration of the sTRP, the predetermined resource(s) associated with the sTRP ID, and the best compatible channel quality in terms of the pTRP determined by the BS or UE.

In some of the present implementations, the UE may identify different resource(s)/resource set(s) from different TRPs via at least one of the information of QCL assumption(s), the target RS port group(s), and reference RS correlation indication.

For example, the network/BS may indicate target RSs to the UE in terms of two reference RS resource sets. According to the TCI state configuration, the target DMRS may be spatially quasi co-located with the reference RS from a TRP. The DMRS ports may be in different target DMRS port groups. In some other implementations, the UE may be configured with an information element of correlation information, and the UE may use it to determine whether two or more resources are from the same TRP. In this case, a low correlation means that the reference RS resources may have a rich spatial multiplexing/diversity and come from different TRPs, and a high correlation may mean that the reference RS resources may come from the same TRP.

Figure 6:
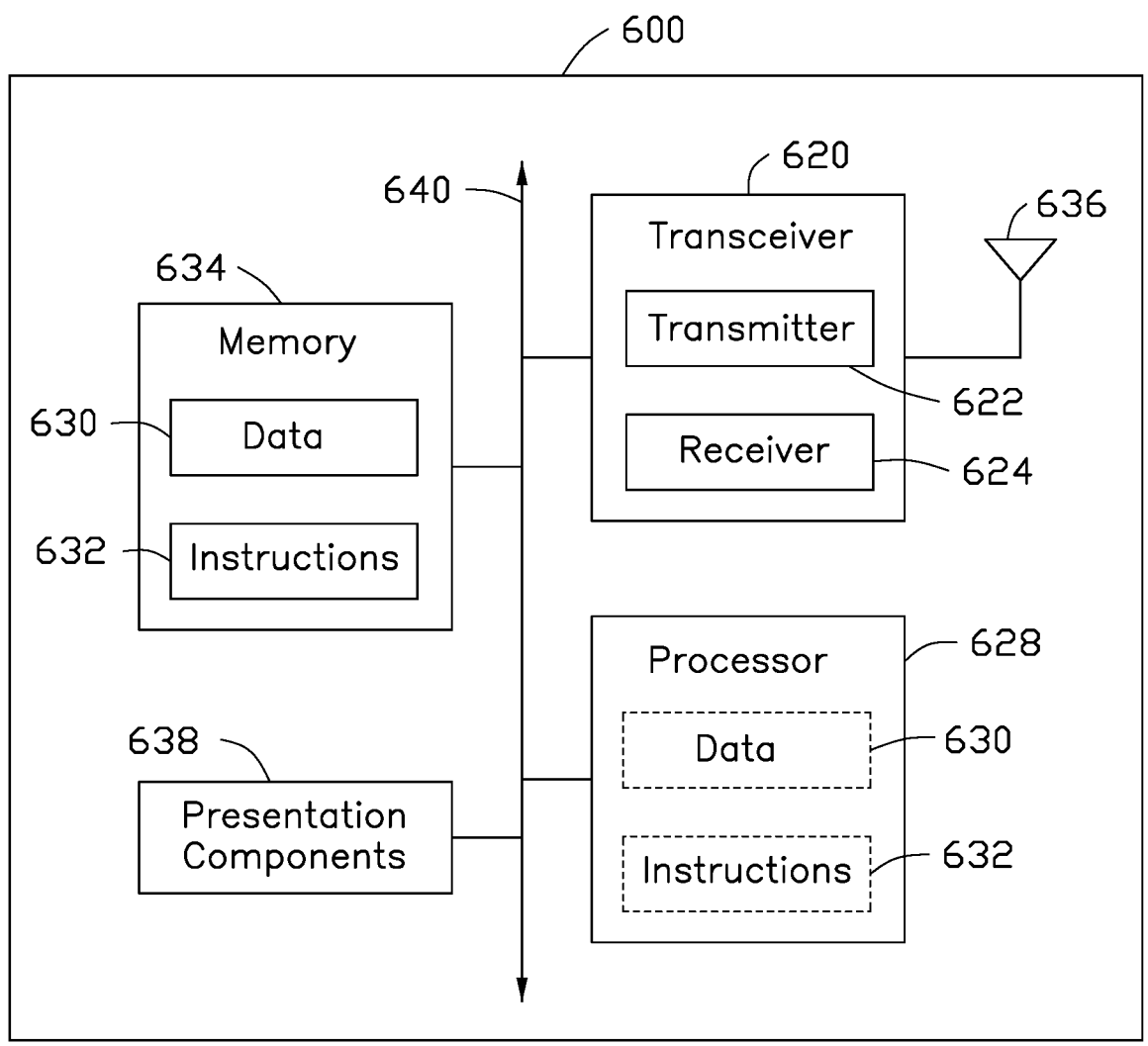
FIG. 6 is a block diagram illustrating a node for wireless communication, in accordance with example implementations of the present application.

FIG. 6 is a block diagram illustrating a node for wireless communication, in accordance with various aspects of the present disclosure. As shown in FIG. 6, a node 600 may include a transceiver 620, a processor 628, a memory 634, one or more presentation components 638, and at least one antenna 636. The node 600 may also include an RF spectrum band module, a BS communications module, a network communications module, and a system communications management module, Input/Output (I/O) ports, I/O components, and power supply (not explicitly shown in FIG. 6). Each of these components may be in communication with each other, directly or indirectly, over one or more buses 640. In one implementation, the node 600 may be a UE or a BS that performs various functions described herein, for example, with reference to FIGS. 1 through 5.

The transceiver 620 having a transmitter 622 (e.g., transmitting/transmission circuitry) and a receiver 624 (e.g., receiving/reception circuitry) may be configured to transmit and/or receive time and/or frequency resource partitioning information. In some implementations, the transceiver 620 may be configured to transmit in different types of subframes and slots including, but not limited to, usable, non-usable and flexibly usable subframes and slot formats. The transceiver 620 may be configured to receive data and control channels.

The node 600 may include a variety of computer-readable media. Computer-readable media may be any available media that may be accessed by the node 600 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or data.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 634 may include computer-storage media in the form of volatile and/or non-volatile memory. The memory 634 may be removable, non-removable, or a combination thereof. Example memory includes solid-state memory, hard drives, optical-disc drives, and etc. As illustrated in FIG. 6, The memory 634 may store computer-readable, computer-executable instructions 632 (e.g., software codes) that are configured to, when executed, cause the processor 628 to perform various functions described herein, for example, with reference to FIGS. 1 through 5. Alternatively, the instructions 632 may not be directly executable by the processor 628 but be configured to cause the node 600 (e.g., when compiled and executed) to perform various functions described herein.

The processor 628 (e.g., having processing circuitry) may include an intelligent hardware device, e.g., a Central Processing Unit (CPU), a microcontroller, an ASIC, and etc. The processor 628 may include memory. The processor 628 may process the data 630 and the instructions 632 received from the memory 634, and information through the transceiver 620, the base band communications module, and/or the network communications module. The processor 628 may also process information to be sent to the transceiver 620 for transmission through the antenna 636, to the network communications module for transmission to a core network.

One or more presentation components 638 presents data indications to a person or other device. Examples of presentation components 638 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE) comprising:
   one or more non-transitory computer-readable media having computer-executable instructions embodied thereon; and
   at least one processor coupled to the one or more non-transitory computer-readable media, and configured to execute the computer-executable instructions to:
   receive, in a Physical Download Control Channel (PDCCH), Transmission Configuration Indicator (TCI) state data for determining a plurality of Physical Downlink Shared Channels (PDSCHs), the TCI state data being associated with a plurality of Demodulation Reference Signal (DMRS) port groups; and obtain a plurality of Quasi Co-Location (QCL) assumptions for receiving the plurality of PDSCHs based on the plurality of DMRS port groups associated with the TCI state data, wherein:

each of the plurality of QCL assumptions corresponds to one of the plurality of DMRS port groups, the TCI state data corresponds to a TCI state configuration that includes a plurality of QCL Reference Signal (RS) sets, and each of the plurality of QCL RS sets corresponds to one of the plurality of DMRS port groups.

2. The UE of claim 1, wherein the at least one processor is further configured to execute the computer-executable instructions to:

identify a plurality of Transmit/Receive Points (TRPs) based on the plurality of QCL assumptions.

3. The UE of claim 1, wherein the at least one processor is further configured to execute the computer-executable instructions to:

receive an instruction for indicating a relationship between the plurality of QCL assumptions and the plurality of DMRS port groups via Medium Access Control (MAC) Control Element (CE) signaling.

4. The UE of claim 1, wherein the at least one processor is further configured to execute the computer-executable instructions to:

indicate a relationship between the plurality of QCL assumptions and the plurality of DMRS port groups when a timer configured for the UE expires.

5. The UE of claim 1, wherein the at least one processor is further configured to execute the computer-executable instructions to:

receive the plurality of DMRS port groups via Radio Resource Control (RRC) signaling, wherein the plurality of DMRS port groups is associated with the plurality of PDSCHs.

6. The UE of claim 1, wherein each of the plurality of QCL assumptions includes at least one of a time-domain QCL parameter, a frequency-domain QCL parameter, and a spatial-domain QCL parameter.

7. A method of wireless communications by a user equipment (UE), the method comprising:

receiving, in a Physical Download Control Channel (PDCCH) Transmission Configuration Indicator (TCI) state data for determining a plurality of Physical Downlink Shared Channels (PDSCHs), the TCI state data being associated with a plurality of Demodulation Reference Signal (DMRS) port groups; and obtaining a plurality of Quasi Co-Location (QCL) assumptions for receiving the plurality of PDSCHs based on the plurality of DMRS port groups associated with the TCI state data, wherein:

each of the plurality of QCL assumptions corresponds to one of the plurality of DMRS port groups, the TCI state data corresponds to a TCI state configuration that includes a plurality of QCL Reference Signal (RS) sets, and each of the plurality of QCL RS sets corresponds to one of the plurality of DMRS port groups.

8. The method of claim 7, further comprising:

identifying a plurality of Transmit/Receive Points (TRPs) based on the plurality of QCL assumptions.

9. The method of claim 7, further comprising:

receiving an instruction for indicating a relationship between the plurality of QCL assumptions and the plurality of DMRS port groups via Medium Access Control (MAC) Control Element (CE) signaling.

10. The method of claim 7, further comprising:

indicating a relationship between the plurality of QCL assumptions and the plurality of DMRS port groups when a timer configured for the UE expires.

11. The method of claim 7, further comprising:

receiving the plurality of DMRS port groups via Radio Resource Control (RRC) signaling, wherein the plurality of DMRS port groups is associated with the plurality of PDSCHs.

12. The method of claim 7, wherein each of the plurality of QCL assumptions includes at least one of a time-domain QCL parameter, a frequency-domain QCL parameter, and a spatial-domain QCL parameter.

* * * * *